United States Patent [19]

Bergholt et al.

[11] Patent Number: 4,850,443
[45] Date of Patent: Jul. 25, 1989

[54] WEIGHING SCALE

[75] Inventors: Steve P. Bergholt, Elgin; King L. Klopfenstein, Prospect Heights; David B. Hutter, Orland Park, all of Ill.

[73] Assignee: Triangle Package Machinery, Chicago, Ill.

[21] Appl. No.: 243,893

[22] Filed: Sep. 13, 1988

[51] Int. Cl.$^4$ .......................... G01G 23/06; G01G 3/08
[52] U.S. Cl. ...................................... 177/188; 177/229
[58] Field of Search ................................ 177/187–189, 177/210 C, 229

[56] References Cited

U.S. PATENT DOCUMENTS

| | | | |
|---|---|---|---|
| Re. 27,056 | 2/1971 | Connors et al. | 177/188 X |
| 3,288,231 | 11/1966 | Hanne | 177/189 X |
| 3,347,328 | 10/1967 | Schieser et al. | |
| 4,054,833 | 10/1977 | Briefer | |
| 4,448,085 | 5/1984 | Lee | 177/210 C X |
| 4,463,614 | 8/1984 | Lee | 177/210 C X |
| 4,497,386 | 2/1985 | Meier | 177/188 X |
| 4,593,778 | 6/1986 | Konishi et al. | 177/187 X |
| 4,798,251 | 1/1989 | Maaz et al. | 177/229 |

OTHER PUBLICATIONS

Setra Systems, Inc., "New Product Announcement, Electronic Load Cell Model 501".
Setra Systems, Inc., "Installation Instructions for Setra's Load Cells".
Setra Systems, Inc., "News, Special Announcement, New Product!, New Division! High Precision Load Cell, 1/50,000 Precision".

Primary Examiner—George H. Miller, Jr.
Attorney, Agent, or Firm—Neuman, Williams, Anderson & Olson

[57] ABSTRACT

A weighing scale is disclosed with high accuracy and speed and minimal response to vibrations having a balanced mass construction and including a variable capacitance load cell coupled to the load side of the scale and having a spring rate substantially greater than the spring rate of the remaining scale components.

12 Claims, 3 Drawing Sheets

WEIGHING SCALE

BACKGROUND OF THE INVENTION

This invention relates to weighing scales and, more specifically relates to high speed scales which are both highly accurate and resistant to external vibrations.

A common industrial use of weighing scales is the measurement of predetermined portions or amounts of products such as food items to be placed in bags or similar closed packages. Multiple scales are often included in a single combination weighing machine. In such a combination weighing machine, multiple portions of product are weighed by multiple scales and various ones of the portions are selected and combined for placement into a single package. A single combination weighing machine typically includes eight to sixteen separate weighing scales. Examples of such combination weighing machines are disclosed in U.S. Pat. No. 4,538,693. The overall accuracy of a combination weighing machine can be no greater than the combined accuracy of the individual weighing scales. Moreover, the speed of operation of a combination weighing machine can be limited by the speed with which the individual weighing scales produce a measurement.

In some uses weighing scales can be subject to significant amounts of vibration. For example, a combination weighing machine such as that described includes multiple hoppers with pneumatically operated doors and other mechanically driven elements. The rapid closure of such doors or the operation of other mechanical elements commonly causes vibrations which are transmitted to the scales. Further, combination weighing machines are commonly located above a bagging machine which forms a bag from raw stock, places the output of the weighing machine into the bag, and seals the bag. Bagging machines may create vibrations which are transmitted to the weighing machine and its scales even if the weighing machine is anchored to the plant floor separately from the bagging machine. The vibration problem is aggravated when the weighing machine is mounted on top of the bagging machine rather than being separately anchored, but such mounting can significantly reduce the amount of plant floor space required to perform the weighing and bagging operations. A further vibration problem arises from the rapid filling of the scale bucket with the product to be weighed.

Weighing scales have previously been known which overcome the vibration problem to a large degree. They have been referred to as "balanced mass scales." Such scales are disclosed in U.S. Pat. Re. Nos. 27,056 and 3,347,328. In such scales, the center of the mass moment of the weighing elements in the horizontal plane is located in the vertical plane passing through the counterbalance pivot and the center of the mass moment of the weighing elements in the vertical plane is located in the horizontal plane which passes through the counterbalance pivot. The scales described in the two referenced patents included as the principal spring elements flexures which were used in the counterbalance pivot, the coupling between the weigh bucket load and counterbalance elements, and the structure used to restrain the load element from horizontal motion while permitting it to move vertically.

While such scales have proven satisfactory in the past, it has been found desirable to develop scales having increased accuracy and speed. Most notably, the accuracy of prior scales was limited because of the creep and hysteresis effects in the springs or flexures used in the scales.

DESCRIPTION OF THE PREFERRED EMBODIMENT

Figure 1:
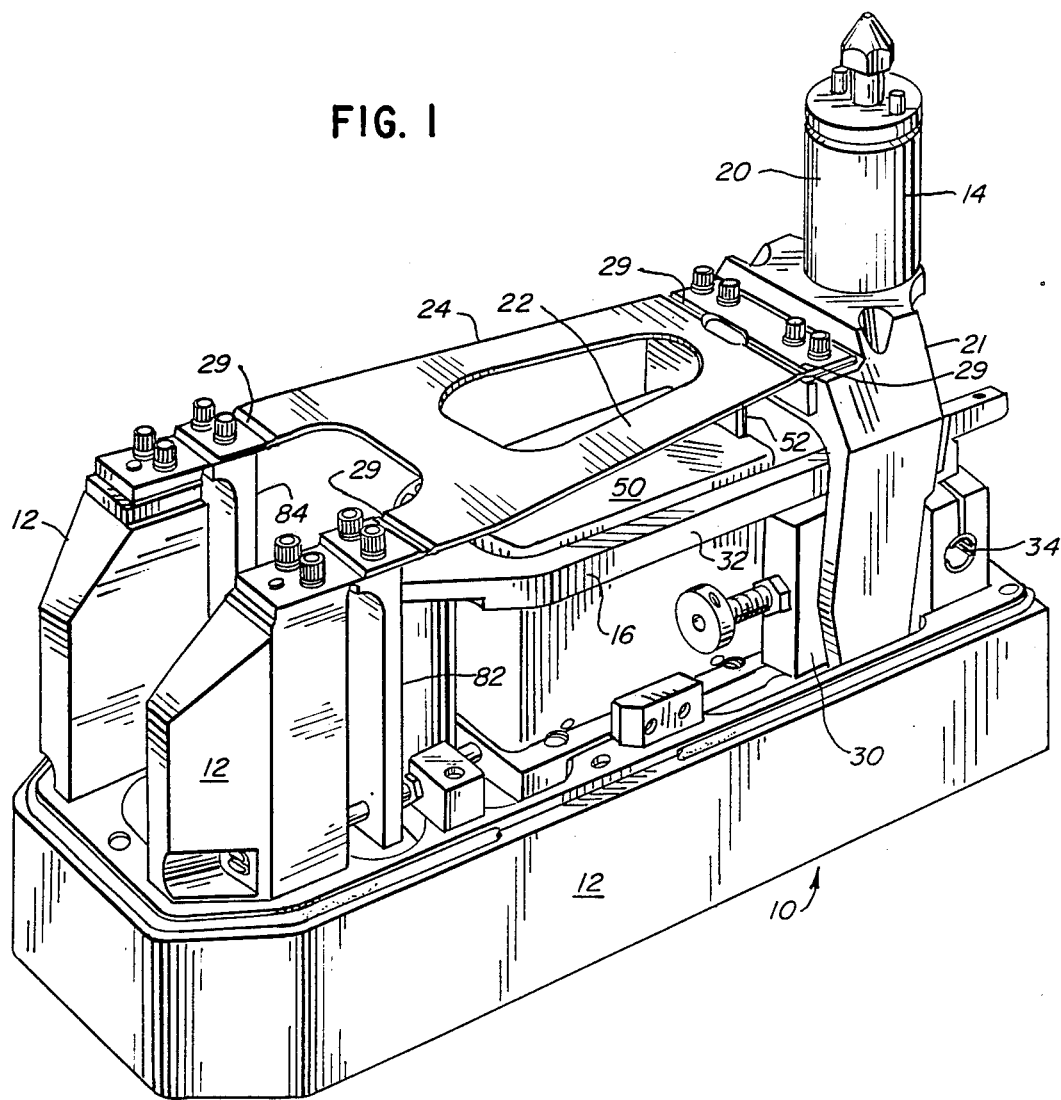
FIG. 1 is a perspective view of a weighing scale of this invention with the cover and weigh bucket removed.
Figure 2:
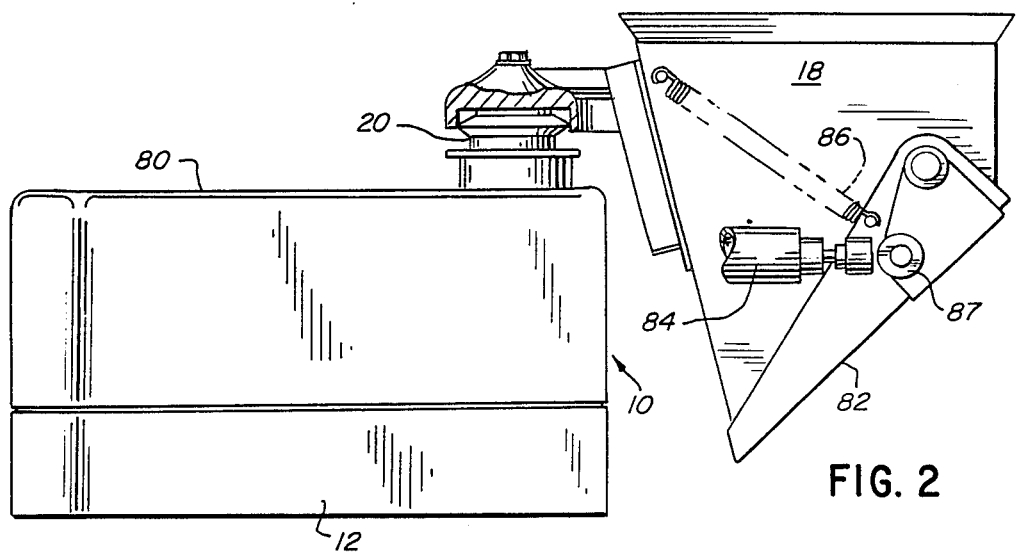
FIG. 2 is a side view of the scale of FIG. 1 with the cover and weight bucket in place.
Figure 3:
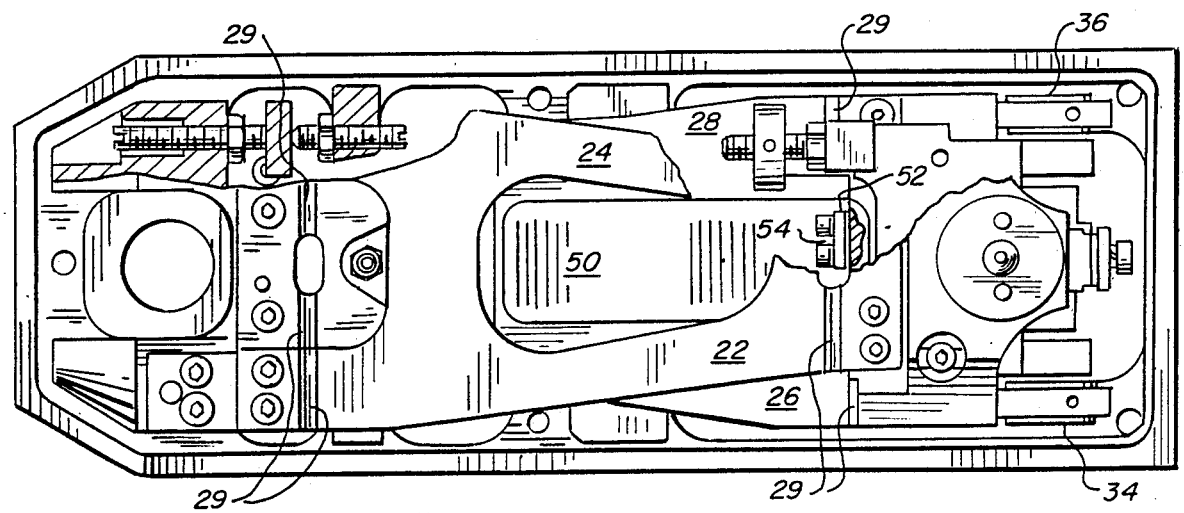
FIG. 3 is a segmented side view of the weighing scale of FIG. 1.
Figure 4:
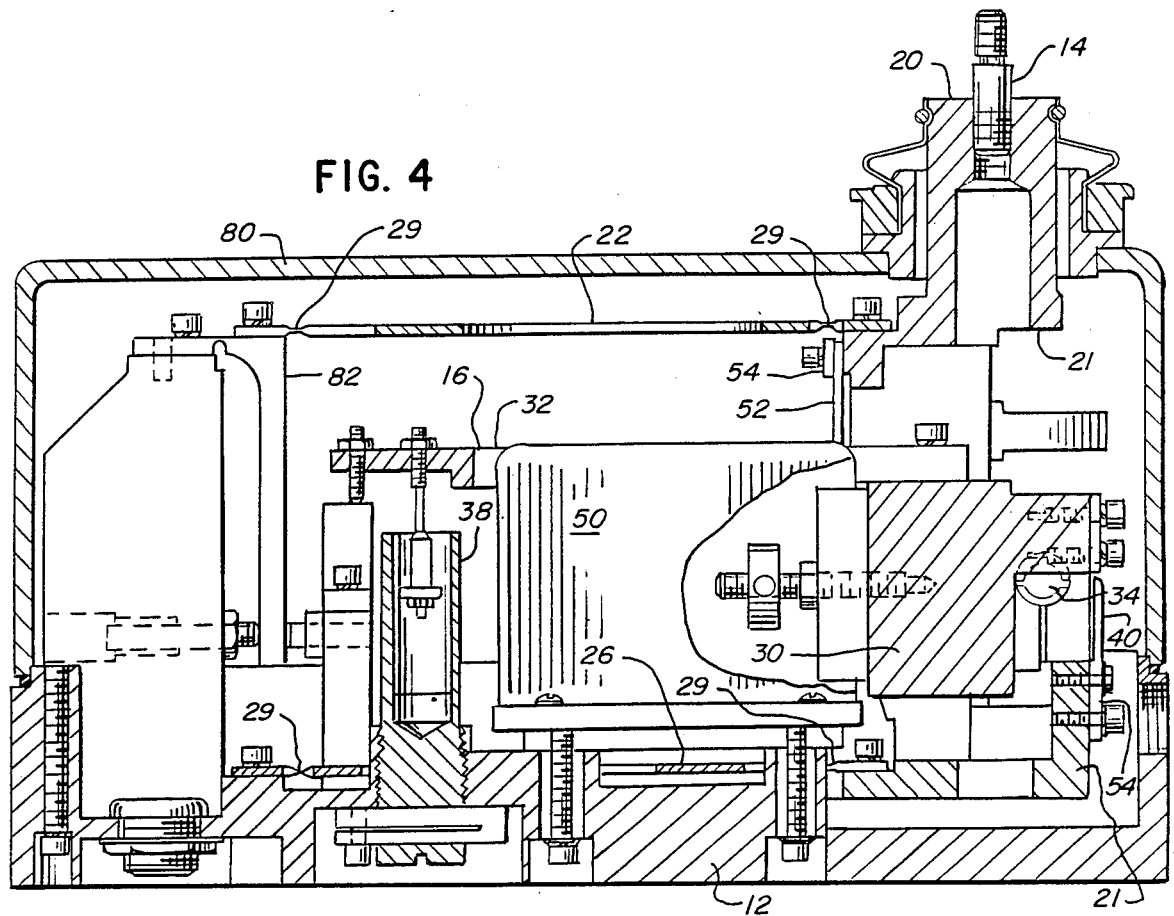
FIG. 4 is a segmented plan view of the weighing scale of FIG. 1.

A preferred weighing scale 10 of this invention is disclosed in FIGS. 1-6 of the drawing and it will be described herein to the extent necessary to an understanding of the invention. Portions of the scale construction which either will be evident to those versed in the art from the drawing or are not important to an understanding of the invention will not be discussed in order to keep the description as concise as possible.

The scale 10 has a frame 12. The scale 10 may be envisioned as including two principal weighing elements mounted for movement with respect to the frame 12, a load element 14 and a counterbalance element 16. The load element is comprised of a weigh bucket 18 integral with a weigh bucket support 20, which support is attached to a load cell driver 21, the driver 21 being mounted to the frame 12 through a coupling system including four horizontal, flexure members 22, 24, 26 and 28. Each flexure is connected at one end to the frame 12 and at the other end to the load cell driver 21 and has a necked, pivot portion 29 closely adjacent each point of connection. The coupling system substantially fixes the weigh bucket 18 in a horizontal plane while permitting it to move freely vertically. The weigh bucket 18 has an open top to receive the material to be weighed; once weighed, the material is discharged from the bottom of the weigh bucket.

The counterbalance element 16 is comprised of a counterbalance 30 and a beam 32 affixed together. The counterbalance element 16 is attached to the frame 12 at two pivot points 34, 36 for rotational motion with respect to the frame. A crossed flexure pivot is provided at each of pivot points 34 and 36, one portion of each crossed flexure pivot being attached to the frame 12 and the other being attached to the counterbalance 30. A dashpot 38 is coupled between the frame and the end of beam 32 more remote from the pivot points 34, 36 to damp out the motion of the scale. A vertically disposed flexure 40 couples the end of beam 32 through the counterbalance 30 to pivot points 34 and 36 (i.e., the end of beam 32 adjacent the counterbalance 30) to the load cell driver 21.

The scale 10 additionally includes a load cell 50 affixed to the frame 12. The load cell includes a drive stem 52 which is attached to load cell driver 21 by a clamp 54 so that the load cell stem moves vertically with the load cell driver. The load cell generates an electrical output signal on leads not shown which is proportional to the motion of the drive stem. Such load cells are generally described in U.S. Pat. Nos. 4,448,085, 4,054,833, and 4,463,614. The load cell output signal is filtered and analyzed by suitable electronic circuitry to generate a signal representative of the weight of product placed within the weigh bucket 18.

Figure 5:
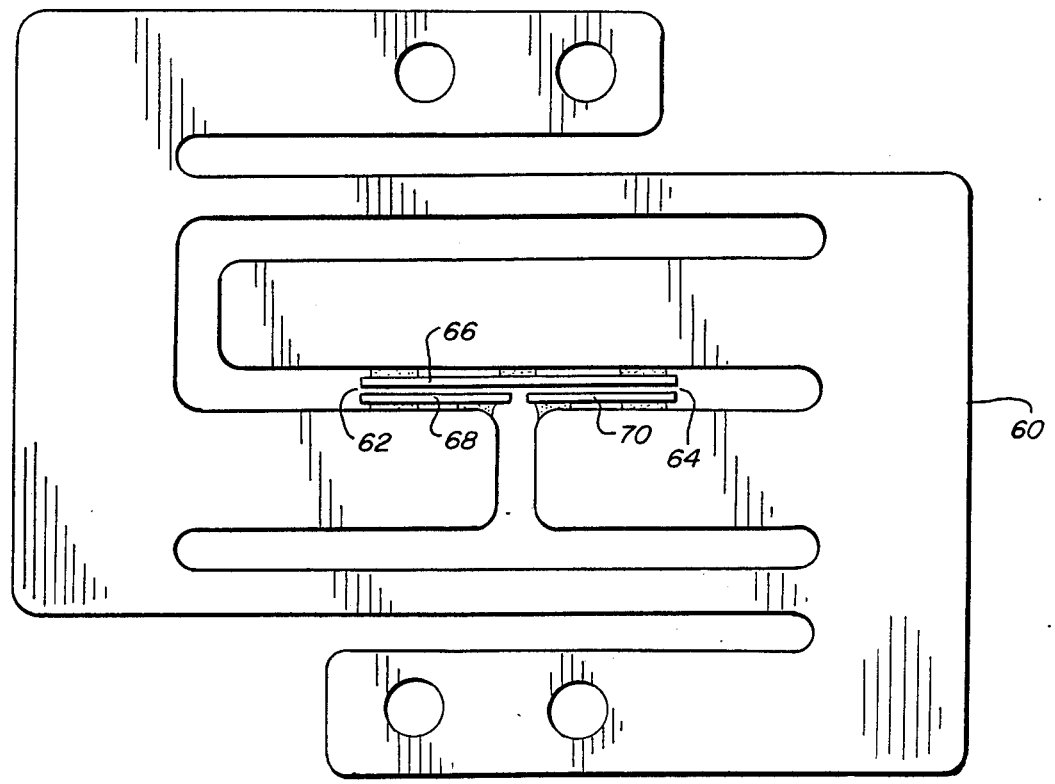
FIG. 5 is a diagrammatic view of a portion of the load cell included in the weighing scale of FIG. 1.

The load cell 50 includes a load cell element 60 shown diagrammatically in FIG. 5. The load cell element 60 is formed of a molded ceramic, dielectric and nonmetallic material. Quartz is a possible alternative dielectric and nonmetallic material for the load cell element. Two electrical capacitors 62, 64 are incorporated within the load cell element. The first capacitor 62 is formed from two metallic plates 66, 68 attached to different portions of the load cell element 60 and located within the load cell element so that the spacing between the plates, and thus the capacitance of capacitor 62, varies in response to the vertical force applied between the top and the bottom of the element. The second capacitor 64 is formed from two metallic plates 66, 70 also attached to different portions of the load cells element 60 and located within the load cell element so the spacing between the plates 66, 70, and thus the capacitance of capacitor 64, varies in the same way that the spacing between the plates 66, 68 varies except that the spacing between the plates 66, 70 is independent of the force applied between the top and bottom of load cell element 60. Thus, the difference in the capacitances of capacitors 62 and 64 indicates the force applied between the top and bottom of the load cell element. Plate 66 is common to both capacitors 62, 64. The ceramic load cell element 60 performs a function analogous to that of a mechanical spring, but it has a high spring rate and very low error due to hysteresis or creep.

Figure 6:
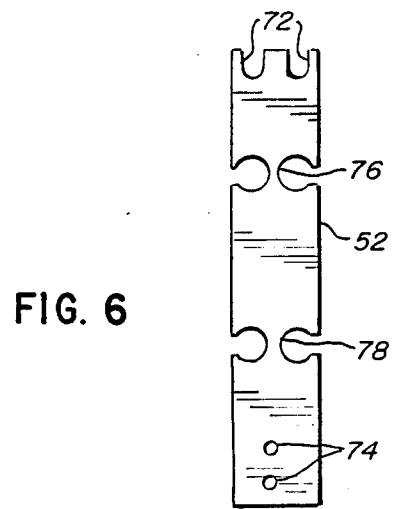
FIG. 6 is a side view of the load cell stem included in the weighing scale of FIG. 1.

For load cells such as that described to be used successfully, it is important that the force applied to the load cell element have components in only a single direction. Using the orientation of FIG. 5, the force applied to the load cell element 60 must be vertical with substantially no horizontal components. If significant horizontal force components are transmitted to the load cell element 60, the resultant measurement will be rendered inaccurate. In the scale 10, flexures 22, 24, 26 and 28 confine the load cell driver 21 in the horizontal plane so that it can move substantially only vertically. (The amount of horizontal motion of the load cell driver can be reduced to an amount desired by increasing the length of the flexures 22, 24, 26 and 28.) In a weighing scale 10 having a weigh bucket which receives the material to be weighed through its top and discharges the material from its bottom, it is usually necessary to offset the center of the weigh bucket from the center of the spring element, so merely locating the load cell 50 directly under the weigh bucket 18 to eliminate horizontal forces on the load cell stem is not practical. A load cell stem 52 is shown in FIG. 6 to further reduce any horizontal forces which might otherwise be transmitted to the load cell element 60 from the load cell driver 21.

The load cell stem 52 is made of flat sheet material. It includes two slots 72 for fastening the stem to the load cell driver 21 with clamp 54 and two holes 74 for fastening the stem to the load cell. Two necked areas 76 and 78 are located on the stem 52 intermediate the slots 72 and the holes 74. The stem is of sufficiently thin material that, in combination with necked areas 76 and 78, the stem is highly resistant to the transmission of horizontal forces between the load cell driver 21 and the load cell 50.

It will thus be seen that as material to be weighed is placed in weigh bucket 18, the weigh bucket, the weigh bucket support 20 and the load cell driver 21 will tend to move downward. That downward motion will be transferred through flexure 40 to the counterbalance 32 and the beam 30. Adding weight to the bucket will also cause the beam 30, and the counterbalance 32 to rotate clockwise about the pivot against the force of gravity on the counterweight. Downward motion of the weigh bucket and weigh bucket support will also be against the resisting force of the load cell 50 transmitted to the load cell driver 21 through the clamp 54 and the drive stem 52.

In accordance with one aspect of this invention, the load cell 50 is coupled between the frame 12 and the load element 14. This is advantageous in that the accuracy of the load cell output is not effected by the vertical flexure 40 or the pivot mechanisms at the pivot points 32, 34. If the load cell were coupled to the counterbalance element, any deformation of the flexure 40 or the pivots such as might be caused by creep or hysteresis would result in an erroneous output signal from the load cell. Load cells are known which have substantially no creep and/or hysteresis. Further, if the load cell were coupled to the counterbalance element, the rotation of the counterbalance element might create lateral forces on the load cell element. Such lateral forces would disrupt the load cell operation.

In accordance with another aspect of the invention, the weight and placement of the components of the load and counterbalance elements 14 and 16 are selected to result in a balanced mass structure. More specifically, they are chosen so that the center of mass moments of the combined load and counterbalance elements in the horizontal plane is in the vertical plane which passes through the pivot points 32, 34, and the center of mass moments of those elements in the vertical plane is in the horizontal plane which passes through the pivot points 32, 34. With such a construction, the weighing scale will be resistant to the effect of external vibrations transmitted to the scale through frame 12 in both the horizontal and vertical planes. The exact geometries required in order to obtain such a balanced mass structure will depend on the design details of the particular scale involved.

Of course, the vibrations which are of concern in a scale are the vibrations which occur when the product to be weighed is in the weigh bucket. Since the weight of product is a variable, it is normally not possible to obtain an exact balanced mass relationship as described. However, it is possible to closely approximate it by designing the scale to have a balanced mass when the scale contains a weight of product which is an average of the expected product weights. Further, in the usual case the weight of product to be measured is very small compared to the weight of the weigh bucket 12 and the weigh bucket support 20, and, thus, of the counterbalance 30, so that the deviation from an ideal balanced mass relationship caused by the product being weighed is negligible.

Moreover, as will be apparent to those versed in the art, in any particular scale of this invention it is desirable to maintain the distances from both the horizontal and vertical centers of momentum of both the load element and the counterbalance element to the line connecting the scale pivots 34, 36 as small as possible. Keeping those distances small will minimize the time required to make a measurement with the scale.

In accordance with a further aspect of this invention, the spring rate of the load cell 50 is substantially larger than the combined spring rates of the remaining elements of the structure. The combined spring rate of the remaining elements in the scale 10 may be determined by removing load cell 50 and determining the weight of material in weigh bucket 18 required to cause the weighing element 14 to move downward one unit of distance. It has been found to be advantageous for the spring rate of load cell 50 to be at least approximately five times the spring rate of the remaining elements of the weighing scale. As mentioned, the load cell element 60 is formed of a ceramic, dielectric and nonmetallic material. The use of such a material permits achieving quite high spring rates with very low error due to hysteresis and creep. By making the spring rate of the load cell 50 substantially greater than the combined spring rates of the remainder of the scale, any error due to hysteresis and creep in the remainder of the scale can be made insignificant.

One scale constructed using the configuration of the drawing was intended to measure product weights in the range of approximately 0.05 to 20 ounces. That scale used a weigh bucket, weigh bucket support and load cell driver which together weighed approximately 10 pounds. The counterbalance and beam had approximately the same total weight with the necessary configuration to achieve a balanced mass relationship. That scale used a variable capacitance load cell available from Setra Systems, Inc., 45 Nagog Park, Acton, Mass. as the Model 501 with a spring rate of approximately 3,500 pounds/inch and a maximum load of 10 pounds. Each of flexures 22, 24, 26 and 28 were approximately 5.225 inches long and had a spring rate of approximately 8 pounds/inch, while flexure 40 was approximately one inch long and had a spring rate of approximately 2 pounds/inch. The flexures at the pivot points 32, 34 were available from Bendix Fluid Power Division, 211 Seward Avenue, Utica, N.Y. 13503 as part number 5016-600 and had a spring rate of approximately 6.5 pounds/inch-radian. The overall spring rate of the scale 10 without load cell 50 was approximately 130 pounds per inch. The dashpot 38 provided critical dampening.

As will be apparent, in the scale described the ratio of the spring rate of the load cell 50 to the spring rate of the remaining elements of the scale including the flexures 22, 24, 26, 28, 40 and the Bendix flexures 34, 36 was 3,500/130 or approximately 27. This ratio is sufficiently large in that the hysterisis and creep error due to the elements other than the load cell is practically negligible. In the scale described, the elements other than the load cell had a total hysterisis and creep error of approximately 0.1%, whereas the hysterisis and creep error for the load cell was approximately 0.002%, and the total hysterisis and creep error for the entire scale was approximately 0.005%. This scale as described was able to achieve weighing speeds as high as 80 cycles per minute. The hysteresis error was approximately ±0.05 grams and the nonlinearity error was approximately ±0.005% of the full scale reading. With scales of the prior art such as those of the type disclosed in U.S. Pat. Re. Nos. 27,056 and 3,347,328 mentioned above, applicants were only able to achieve speeds of 65 cycles per minute with hysteresis error of approximately ±0.30 grams and nonlinearity error of approximately ±0.07% of the full scale reading.

The following procedure may be used to bring the scale 10 into a balanced mass relationship:

1. Precision ball bearings are installed at the location of the crossed flexure pivots at the pivot points 34, 36 to allow free rotation of the beam 32;
2. A gauging mechanism with a stop, not shown, which prevents counterclockwise rotation of the beam 32 is adjusted until the front face of the beam adjacent the flexure 40 is vertical when the beam rests against that stop, and the position of the beam is then fixed by a mechanism not shown;
3. The load cell driver 21 is placed in its proper vertical position by a gauging mechanism not shown and is then attached to the beam 32 using a precision gauge in place of flexure 40 to properly locate the load cell driver 21 horizontally so that its front face is aligned with the front face of the beam 30;
4. The flexures 22, 24, 26 and 28 are mounted between the frame 12 and the load cell driver 21;
5. The flexure 40 is installed in place of the precision gauge referenced in step 3;
6. The crossed flexure pivots are installed at the pivot points 34, 36 in place of the bearings referred to in step 1;
7. The mechanism which maintains the load cell driver 21 at its vertical location referred to in step 3 is removed;
8. The weigh bucket 18 and weigh bucket support 20 are attached to the load cell driver 21;
9. The weight or position of the counterbalance 30 on beam 32 is adjusted until the beam rests on the stop referred to in step 2, a 0.001 inch shim is placed between the stop and the beam, the weight is readjusted so that the beam rests on the shim but not the stop if the shim is removed, and the shim is then removed;
10. The clamp 54 is secured to connect the load cell stem 52 to the load cell driver 21; and
11. The gauging mechanism preventing the beam 32 from rotating clockwise referred to in step 2 is removed.

As mentioned, the balancing procedure may also be performed with an expected average weight of the product to be measured in the weigh bucket.

The weighing scale 10 includes a cover 80 which prevents dust and other objects from coming into contact with the scale mechanism. Weigh bucket 18 has a bottom door 82 operated by a pneumatic cylinder 84 operating against a roller 87 on said door which is held closed by spring 86 so that the weighed product can easily be removed from the scale. In a common application of the scale 10 where multiple scales are located on a common, high speed weighing machine, the rapid closure of the accumulator hopper doors and holding chamber hopper doors, not shown, related to each scale can alone be a source of significant vibration for the scales. The balanced mass construction significantly isolates each scale from the vibration caused by operation of the other hopper doors associated with the scales. Further, the balanced mass construction permits the use of a scale mechanism which has sufficient sprung weight that the effect on the scale operation from closing of its own hopper door may be largely eliminated.

As will be apparent from the drawing, in the scale 10 each of the upper pair of flexures 22, 24 and the lower pair of flexures 26, 28 is formed from a single flexure piece of generally "U" shape, the upper and lower flexure pieces being oriented in opposite directions. Each of the upper and lower flexure pairs have four necked, pivot portions 29, one pivot portion being located at each end of each flexure 22, 24, 26, and 28, the pivot portions on each flexure being equally spaced. The flexure pairs are parallel to each other.

The scale 10 has applicability both as a net weigher and as a check weigher. Counterbalance 30 may be movable on the beam 30 or may include provision for adding, removing, or moving relatively small weights so that the weight to be measured with the weighing scale 10 can be changed easily. The dashpot may be located between the counterbalance element and the frame as shown, or between the load element and the frame. While a load cell 50 of the type described is believed to be preferable, many of the advantages of this invention could also be obtained using a strain gauge load cell or a metallic spring and sensing element in place of the capacitance load cell 50.

In the construction of scale 10, rigidity of the frame 12 is an important consideration. In the preferred scale of the drawing, the lower portion of frame 12 is formed of a solid block of material hollowed out to receive the lower-portions of the load and counterbalance elements including the lower flexures 26 and 28. The cover 80 also increases the rigidity of the frame. "L" shaped members 82, 84 are interposed between the upper flexures 22, 24 and the frame 12 as shown in the drawing so that, with the associated stops, the spacing between the upper and lower flexures may be precisely maintained.

While the invention has been described with reference to a particular embodiment, it is to be understood that variations, modifications, and the substitution of equivalent mechanisms can be made without departing from the spirit and scope of this invention.

We claim:
1. A weighing scale comprising:
   (a) a frame;
   (b) a movable load element including a load receiving member adapted to receive a quantity of the product to be weighed;
   (c) a coupling system mounted between said load element and said frame and restricting the horizontal movement of said load element;
   (d) a movable counterbalance element, said counterbalance element being in substantially balanced mass relationship with said load element;
   (e) a pivot system having a first part mounted on said frame and a second part mounted on said counterbalance element;
   (f) a flexible coupling between said load element and said counterbalance element; and
   (g) a load cell coupled between said load element and said frame with a predetermined spring rate and providing an electrical output signal responsive to the vertical movement of said load member with respect to said frame;
   (h) said spring rate being greater than the combined spring rate of said coupling system, said pivot system and said coupling.
2. The weighing scale of claim 1 wherein said predetermined spring rate of said load cell is greater than five times said combined spring rate.
3. The weighing scale of claim 2 further comprising a dashpot element coupled between said counterbalance element and said frame.
4. The weighing scale of claim 2 wherein the coupling of said load cell between said load element and said frame comprises a load cell stem transmitting vertical forces to said load cell and isolating said load cell from horizontal forces.
5. A weighing scale comprising:
   (a) a frame;
   (b) a movable load element including a load receiving member adapted to receive a quantity of the product to be weighed;
   (c) a coupling system mounted between said load element and said frame and restricting the horizontal movement of said load element;
   (d) a movable counterbalance element, said counterbalance element being in substantially balanced mass relationship with said load element;
   (e) a pivot system having a first part mounted on said frame and a second part mounted on said counterbalance element;
   (f) a flexible coupling between said load element and said counterbalance element;
   (g) a spring element formed of dielectric material and coupled between said load element and said frame and having a predetermined spring rate;
   (h) said spring rate being greater than the combined spring rate of said coupling system, said pivot system and said coupling; and
   (i) circuit means providing an electric output signal responsive to the vertical movement of said load element with respect to said frame.
6. The weighing scale of claim 5 wherein said predetermined spring rate said dielectric spring element is greater than five times said combined spring rate.
7. The weighing scale of claim 6 wherein said coupling system, said pivot system, and said flexible coupling are metallic.
8. The weighing scale of claim 7 wherein said dielectric material is nonmetallic.
9. In a balanced mass weighing scale including a frame, a movable load weighing element including a load receiving member for receiving a quantity of the product to be weighed, a movable counterbalance weighing element, a coupling between said load weighing element and said counterbalance weighing element, and a spring member for resisting movement of said load member, the improvement wherein said spring member is comprised of a load cell coupled between said frame and said load receiving member and having a spring rate which is greater than the combined spring rate of the remaining components of the weighing scale.
10. The weighing scale of claim 9 wherein said predetermined spring rate of said load cell is greater than five times said combined spring rate.
11. A load cell weighing scale comprising:
   (a) a frame;
   (b) a movable load element including a load receiving member adapted to receive a quantity of the product to be weighed;
   (c) a coupling system mounted between said load element and said frame and restricting the horizontal movement of said load element;
   (d) a movable counterbalance element;
   (e) a pivot system having a first part mounted on said frame and a second part mounted on said counterbalance element, the horizontal mass moment of said load and counterbalance elements lying in a vertical plane passing through said pivot system and the vertical pass moment of said load and counterbalance elements lying in a horizontal plane passing through said pivot system;

(f) a flexible coupling between said load element and said counterbalance element; and
(g) a load cell coupled between said load element and said frame with a predetermined spring rate and providing an electrical output signal responsive to the vertical movement of said load member with respect to said frame;
(h) said spring rate being greater than the combined spring rate of said coupling system, said pivot system and said coupling.

12. The weighing scale of claim 11 wherein said predetermined spring rate of said load cell is greater than five times said combined spring rate.

* * * * *

UNITED STATES PATENT AND TRADEMARK OFFICE
CERTIFICATE OF CORRECTION

PATENT NO. : 4,850,443

DATED : July 25, 1989

INVENTOR(S) : Steve P. Bergholt, et al

It is certified that error appears in the above-identified patent and that said Letters Patent is hereby corrected as shown below:

Column 2, line 20, "EMBODIMENT" should read --EMBODIMENT(S)--.

Column 5, line 15, after "metallic," delete ":".

Column 8, line 29, after "rate" insert --of--.

Column 8, line 66, "pass" should read --mass--.

Signed and Sealed this

Thirtieth Day of January, 1990

Attest:

JEFFREY M. SAMUELS

*Attesting Officer*     *Acting Commissioner of Patents and Trademarks*